Aug. 23, 1932.  L. VON WITZKI  1,873,081

RECEPTACLE

Filed Nov. 8, 1930

INVENTOR.
LEO VON WITZKI
BY
White Prost Flehr & Lothrop
ATTORNEYS.

Patented Aug. 23, 1932

1,873,081

UNITED STATES PATENT OFFICE

LEO VON WITZKI, OF SAN FRANCISCO, CALIFORNIA

RECEPTACLE

Application filed November 8, 1930. Serial No. 494,325.

My invention relates to receptacles for molding ice or other frozen substances and is particularly applicable to receptacles of this character which are suitable for use in domestic refrigerating apparatus.

Heretofore it has been common to employ a receptacle for freezing ice in electric refrigerators which comprises a tray having partitioning walls for dividing the tray into a plurality of cubical compartments. Frequently, however, it is desirable to freeze individual desserts or blocks of ice and partitioned trays are unsuitable for this purpose.

It is one object of my invention to provide a tray having a plurality of individual and separable molds.

Another object is to provide a receptacle or mold having resilient side walls whereby the contents of the mold can be readily removed.

Still another object is to provide a mold of this character having means for facilitating flexing of the walls of the mold.

These and other objects and advantages are attained in the embodiments of my invention illustrated in the accompanying drawing, in which.

Figure 1:
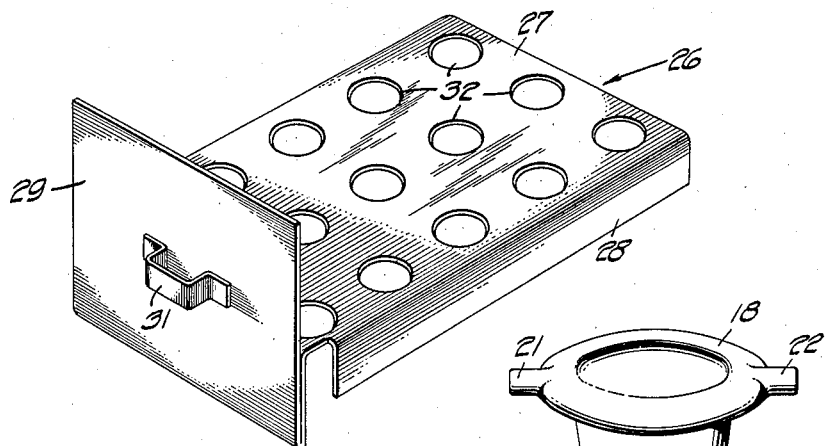
Fig. 1 is a perspective view of a tray suitable for supporting a plurality of individual molds.
Figure 2:
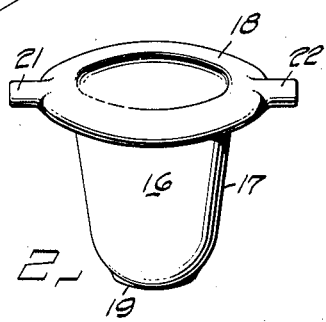
Fig. 2 is a perspective view of a mold or receptacle constructed in accordance with this invention.

In its preferred form my invention comprises a mold or receptacle having resilient walls and means for facilitating flexing of the walls to remove the contents. A suitable tray is provided for supporting a plurality of molds separately so that any desired number of molds can be placed in the tray or removed therefrom without disturbing the others.

Referring now to the drawing, I have shown a cup shaped receptacle 16 having a side wall 17, preferably of resilient material, and a relatively thick beaded edge 18 adjacent the mouth of the receptacle. The receptacle 16 is provided with a base 19 which preferably has a relatively flat bottom surface for supporting the receptacle in an upright position when it is placed on a table top or other flat surface. The receptacle can be made of suitable resilient material, such as rubber, the walls 17 being made relatively thin and the rim 18 and the base 19 being made relatively thick.

Liquids placed in the receptacle 16 and frozen therein can be removed upon flexing or collapsing walls 17 by applying a force against rim 18 which tends to move the rim toward the base 19. For facilitating flexing or collapsing of the walls 17, rim 18 is preferably provided with a pair of laterally extending tabs 21 and 22 and the walls 17 are preferably tapered as illustrated. By this construction the frozen contents can be readily removed by grasping the receptacle in one hand with a finger placed against each of the tabs 21 and 22 and with the thumb bearing against the bottom surface of base 19. While the receptacle is being held in this position, the walls 17 can be flexed by applying a compressional force against the rim 18 and base 19, and the contents of the receptacle can be forced out by pressure exerted by the thumb against base 19.

If desired rim 18 can be reinforced by imbedding therein a wire 23 which can have a covering 24, of cotton thread or the like, for improving the bonding surface.

For supporting a plurality of the individual receptacles separately I have shown a tray 26, formed of suitable sheet metal which can be shaped as shown to provide a platform 27, sides 28 and a front 29. The front 29 of the tray has secured thereto in any suitable manner a handle 31. Preferably, a plurality of apertures 32 are provided in platform 27, each of which is suitable for receiving and supporting one of the receptacles 16.

Figure 3:
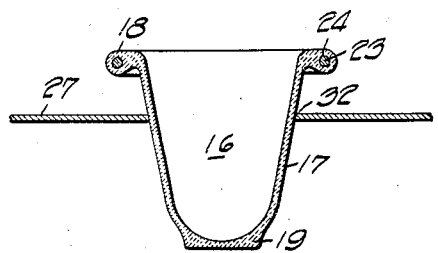
Figs. 3, 4 and 5 illustrate different arrangements for supporting the receptacle in the tray.

In Fig. 3 I have shown one manner in which each receptacle can be supported by the tray 26. In this form of the device, the dimensions of each aperture 32 are such that the receptacle will be supported by engagement of an intermediate portion of the side walls 17 with the tray. The receptacle can be removed by lifting the same by rim 18 or by pushing against the base 19.

Figure 4:
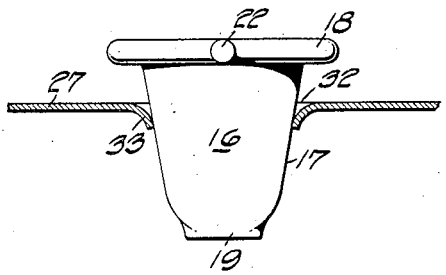

In order to preclude wedging of the receptacle in the supporting tray due to expansion of the contents or other causes, each of the apertures in the tray can have a peripheral edge 33 which is bent downwardly, as shown in Fig. 4. In this embodiment expansion of the contents while freezing causes the receptacle to rise slightly in the tray along the inclined surface formed by curved edge 33.

Figure 5:
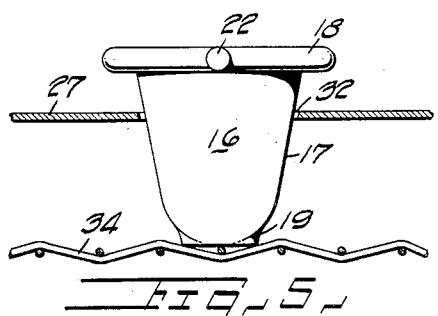

If desired, a rack 34 of woven wire can be provided upon which the base 19 of each receptacle can rest, as shown in Fig. 5. In this embodiment, the aperture 32 is preferably made large enough to permit free withdrawal of the receptacle even after the contents have expanded.

Figure 6:
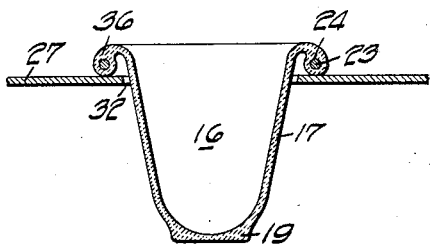
Fig. 6 illustrates a modified form of receptacle and the manner in which it can be supported.

Another embodiment of the device is shown in Fig. 6. In this embodiment the rim 36 of the receptacle can extend downwardly along the sides of the receptacle for a short distance so that it will engage the tray near the periphery of the aperture 32 when inserted therein. In this embodiment, also, the aperture 32 is preferably made large enough to allow for expansion.

By reason of the separate supports for each of the individual receptacles, any desired number of receptacles can be withdrawn or replaced at any time without disturbing the other receptacles in the tray. Each receptacle can be emptied separately merely by forcing the rim and base of the receptacle toward each other by the thumb and fingers of one hand and the shape of the solidified contents need not be destroyed. It is to be understood that the receptacle can have any desired cross sectional shape and it need not be circular as illustrated in the drawing.

The receptacle which I have described is suitable for a wide variety of uses and can be utilized for frozen substances, such as ordinary ice or ice cream and also for substances which are adapted to set or solidify without freezing, such as gelatinous or coagulated products.

While I have shown and described certain preferred embodiments of my invention, I do not wish to be limited thereto, since the invention as defined in the appended claims can be embodied in a plurality of other forms.

I claim:

1. A cup shaped receptacle for liquids to be solidified, resilient side walls in said receptacle and a relatively rigid rim adjacent the mouth of said receptacle, said side walls being collapsible by a force exerted against said rims, and tabs projecting from said rim for facilitating the application of said force.

2. A cup shaped receptacle for liquids to be solidified, resilient side walls in said receptacle and a reinforced rim adjacent the mouth of said receptacle, said side walls being tapered from the mouth of the receptacle toward the base of the same thereby permitting said side walls to be flexed by a force tending to move said rim toward the base of the receptacle, and tabs projecting from said rim for facilitating the application of said force.

3. A receptacle for liquids to be solidified, said receptacle having relatively resilient side walls, a relatively rigid base, and a relatively rigid rim adjacent the mouth of the receptacle, said side walls being collapsible by a compressional force applied against said rim and said base to remove the contents of said receptacle, and tabs projecting from said rim for facilitating the application of said force.

4. A rubber cup suitable for liquids to be solidified, said cup having a relatively thin flexible side wall, a relatively thick base, and a relatively thick rim adjacent the mouth of the cup, said side walls adapted to be flexed to remove the contents of said cup by a compressional force applied against said rim and said base, reinforcing means in said rim and projections extending from said rim to facilitate the application of said force.

5. A rubber cup suitable for liquids to be solidified, said cup having relatively thin flexible side walls, a relatively thick base and a relatively thick rim adjacent the mouth of the cup, said side walls being collapsible to remove the contents of said cup by a compressional force applied against said rim and said base, and finger engaging tabs on said rim for affording convenient application of said force by the fingers and thumb of one hand of a user.

In testimony whereof I have hereunto set my hand.

LEO VON WITZKI.